United States Patent
Krehl et al.

(10) Patent No.: US 10,564,663 B2
(45) Date of Patent: Feb. 18, 2020

(54) HAPTIC PEDAL

(71) Applicant: JAGUAR LAND ROVER LIMITED, Coventry, Warwickshire (GB)

(72) Inventors: Claudia Krehl, Warwickshire (GB); Elvir Hasedzic, Warwickshire (GB); Harpreet Singh, Warwickshire (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 0 days.

(21) Appl. No.: 16/075,915

(22) PCT Filed: Dec. 7, 2016

(86) PCT No.: PCT/EP2016/080052
§ 371 (c)(1),
(2) Date: Aug. 6, 2018

(87) PCT Pub. No.: WO2017/137112
PCT Pub. Date: Aug. 17, 2017

(65) Prior Publication Data
US 2019/0064870 A1    Feb. 28, 2019

(30) Foreign Application Priority Data
Feb. 11, 2016 (GB) .................... 1602477.0

(51) Int. Cl.
*G05G 5/03* (2008.04)
*B60Q 9/00* (2006.01)
(Continued)

(52) U.S. Cl.
CPC ............ *G05G 5/03* (2013.01); *B06B 1/0215* (2013.01); *B06B 1/0622* (2013.01); *B60Q 9/00* (2013.01);
(Continued)

(58) Field of Classification Search
CPC ............ B60K 26/021; B60K 2023/005; B60K 2026/022; B60T 7/04; B60T 7/042;
(Continued)

(56) References Cited

U.S. PATENT DOCUMENTS

2007/0109104 A1  5/2007  Altan et al.
2008/0174415 A1  7/2008  Tanida et al.
(Continued)

FOREIGN PATENT DOCUMENTS

CN           103434446 A    12/2013
DE   10 2006 025339 A1    12/2007
(Continued)

OTHER PUBLICATIONS

International Search Report and Written Opinion issued in International Application No. PCT/EP2016/080052, dated Jul. 12, 2017, 15 pages.
(Continued)

*Primary Examiner* — David H Bollinger
(74) *Attorney, Agent, or Firm* — Miller Nash Graham & Dunn LLP

(57) ABSTRACT

The present invention relates to a haptic pedal (10) for a vehicle (4). The pedal comprises a plurality of piezoelectric actuators (22) operable for providing haptic feedback to a driver through the footrest (18) and sensing means (26) for mapping the area of the footrest in contact with a driver's foot so that haptic feedback is delivered by selective activation of actuators in the mapped area. The invention also comprises a haptic feedback system including the haptic pedal (10) and a controller (6) for receiving an input from the sensing means (26) relating to the area of the footrest in contact with the driver's foot and for delivering an output to selectively activate piezoelectric actuators overlapping the contact area in dependence on a sensed state of the vehicle.

(Continued)

The haptic feedback system may be implemented as part of the vehicle's navigation system.

16 Claims, 5 Drawing Sheets

(51) Int. Cl.
 *B06B 1/02* (2006.01)
 *B06B 1/06* (2006.01)
 *G01C 21/36* (2006.01)
 *G05G 1/44* (2008.04)
 *G05G 1/30* (2008.04)

(52) U.S. Cl.
 CPC .......... *G01C 21/3652* (2013.01); *G05G 1/44* (2013.01); *G05G 1/30* (2013.01)

(58) Field of Classification Search
 CPC . B60T 7/06; G05G 1/30; G05G 1/305; G05G 5/03; G01L 5/225; H01H 3/14; H01H 21/26; B60W 50/14; B60W 50/16; B60Q 9/00; G01C 21/3652; B06B 1/0622; B06B 1/0215
 USPC .......................................... 74/560, 563, 564
 See application file for complete search history.

(56) References Cited

U.S. PATENT DOCUMENTS

| | | | | |
|---|---|---|---|---|
| 2011/0106381 | A1* | 5/2011 | Filev | B62D 6/007 701/40 |
| 2011/0205045 | A1* | 8/2011 | Pilutti | B60Q 1/52 340/441 |
| 2011/0282545 | A1 | 11/2011 | Karatsinides | |
| 2012/0169488 | A1* | 7/2012 | Thiel | B60K 26/021 340/438 |
| 2014/0277835 | A1* | 9/2014 | Filev | G01C 21/3469 701/2 |
| 2014/0298949 | A1* | 10/2014 | Brown | G05G 1/40 74/513 |
| 2014/0366678 | A1* | 12/2014 | Wurn | G05G 1/445 74/513 |
| 2018/0001875 | A1* | 1/2018 | Houtman | B60T 7/042 |
| 2018/0232002 | A1* | 8/2018 | Brown | G05G 1/445 |

FOREIGN PATENT DOCUMENTS

| | | |
|---|---|---|
| JP | 2013246788 A | 12/2013 |
| WO | 2008063692 A2 | 5/2008 |

OTHER PUBLICATIONS

Search and Examination Report issued in GB1602477.0, dated Aug. 5, 2016, 5 pages.

* cited by examiner

HAPTIC PEDAL

CROSS-REFERENCE TO RELATED APPLICATIONS

This application is a 371 of International Application No. PCT/EP2016/080052, filed Dec. 7, 2016, which claims priority to GB Patent Application 1602477.0, filed Feb. 11, 2016, the contents of both of which are incorporated by reference herein in their entirety.

TECHNICAL FIELD

The present disclosure relates to a pedal for a vehicle, and more specifically, but not exclusively, to a pedal for providing haptic feedback to a driver of the vehicle. Aspects of the invention relate to a pedal, a haptic feedback system, a vehicle, and a method of providing feedback to a driver of the vehicle.

BACKGROUND

A vehicle, such as a car, includes a speed control system comprised of a drive system and a braking system. The drive system includes an accelerator pedal linked, either mechanically or as part of a drive-by-wire system, to an engine. The position of the accelerator pedal configures the engine to output an engine torque, which engine torque is transferred along a drive train to a set of wheels for moving the car. The braking system includes a brake pedal which when depressed actuates the system by pressing brake pads against brake discs which are associated with two or more of the vehicle wheels, thereby slowing down the rotation of the discs on the wheels and braking the wheels to slow down the vehicle.

The vehicle pedals offer suitable locations for providing haptic feedback to a driver. For example, the feedback delivered to the driver through the accelerator pedal may include, but is not limited to, a warning about excessive speed, of approaching road conditions, or more generally to alert the driver if the vehicle is not being driven in a fuel efficient manner. Feedback delivered via the brake pedal may include, but is not limited to, warnings about loss of traction with the road surface or insufficient pressure on the pedal to avoid a perceived hazard ahead. The haptic feedback is typically delivered by a mechanism that produces a vibration in the pedal.

Whilst conventional vibration mechanisms, such as those generated by torque motors or magnetic actuators, may be used to generate haptic feedback, such mechanisms are relatively bulky and hence awkward to accommodate within the confines of a typical vehicle pedal. Accordingly, the use of piezoelectric elements offers a convenient means for generating haptic feedback to the driver, such elements being able to generate a pulse by rapid deformation and thereby simulate vibration. Moreover, being relatively compact and with a low profile, piezoelectric elements are simple to install without necessitating modification of existing pedal assemblies, and are easily replaceable.

Whilst existing haptic feedback systems employing piezoelectric elements provide several benefits, a problem exists in that some systems require more energy to be used than is desirable. This can prohibit use across a manufacturer's full vehicle range.

It is an object of the present invention to address disadvantages associated with such existing systems.

SUMMARY OF THE INVENTION

Aspects and embodiments of the invention provide a pedal, a haptic feedback system, a vehicle and a method of providing driver feedback as claimed in the appended claims.

According to an aspect of the present invention there is provided a haptic pedal for a vehicle comprising;

a plurality of piezoelectric actuators individually operable for providing haptic feedback to a driver through a footrest; and sensing means (e.g. a sensor) for mapping the area of the footrest in contact with a driver's foot whereby haptic feedback is delivered by selective activation of the actuators in the mapped area.

By means of the invention, it is possible to activate piezoelectric actuators in an area that overlaps with the area where a driver's foot is detected without necessarily having to activate all actuators on the pedal. In other words, the haptic feedback is focussed on the area of the footrest (alternatively referred to as the pedal plate) where the driver's foot is in contact with the pedal. This enables energy expended to provide the haptic feedback to be reduced. Moreover, by virtue of the sensing means, the driver is always assured of receiving the haptic feedback irrespective of where his foot is positioned on the pedal.

References herein to a driver's foot are intended to include footwear worn by the driver, so the area of overlap between the footwear resting on the pedal is sensed.

Generally, the pulsing of the piezoelectric actuators in the mapped area is such as to be detectable through the footwear, typically the sole of a shoe or the like, by the driver's foot. Accordingly, haptic feedback may be delivered to the driver through the ball of the foot, such as when the driver is wearing high-heeled shoes, or through a greater area of the foot, such as the ball and heel, when the driver is wearing work boots, flat shoes or the like.

It will be understood that the area mapped by the sensing means will depend on several factors, including the shoe type worn by the driver, as described above, the position of the foot in relation to the pedal selected by the driver as being most comfortable or convenient, and whether the pedal is a hanging pedal or a floor mounted pedal. All of these factors will have an influence on the area of contact with the relevant pedal. Moreover, the position of the driver's foot on a pedal will typically change numerous times over the course of a journey. However, with the sensing means effectively monitoring the foot position throughout, the driver will receive the haptic feedback wherever his foot rests on the pedal, yet at the same time wasteful pulsing in areas of the pedal not in contact with the foot may be avoided.

The sensing means may be in the form of a sensor or sensors. In an embodiment of the invention, the sensing means comprises pressure sensing means. Pressure sensing means may be provided as an array of pressure sensors, the sensors being spread across the footrest area. Alternatively, the pressure sensing means may comprise a pressure sensitive material. Pressure sensitive material acts by detecting a force, such as that applied when a driver's foot rests against the material, whether directly or indirectly. Pressure sensing materials are advantageous in that they contain no moving parts and are therefore durable, and they may be readily applied to the pedal footrest in a layer, such as by overmoulding, coating or by adhesion from sheets of the material.

A pressure sensitive material suitable for application to vehicle pedals may be one that includes an electrically conductive material, such as a carbon composite material. Such a material has electrical properties that change when pressure is applied.

Another type of pressure sensitive material which may be used is a quantum tunnelling composite material, for example, the QTC® material supplied by Peratech Holdco Ltd. Such quantum tunnelling composites are typically comprised of electrically active filler materials, especially but not limited to metals or metal oxides, dispersed in a non-conducting binder, such as but not limited to an elastomeric binder. The conductive filler elements are distributed in the composite material such that when not under pressure, the elements are insufficiently close to conduct electricity, whereas when pressure is applied to the composite material the conductive elements are forced closer together and electrons can "tunnel" through the binder. When the force is removed electrons are no longer able to flow. This means that in an unpressurised state the composite material effectively operates as an insulator but with any deformation the material becomes a conductor. A quantum tunnelling composite material may be applied to the pedal as a sheet or as a coating.

Optionally, the pressure sensing means detects not only where pressure is applied to the pedal, but also the level of pressure. In this way, the level of haptic feedback may be adjusted to provide a signal of appropriate strength to ensure it is felt by the driver. For example, when the pressure sensing means detects only a light touch on the pedal, the control means may operate to deliver an enhanced pulse via the piezoelectric actuators.

In a further embodiment, the piezoelectric actuators are provided as a plurality of piezoelectric elements in the region of the footrest so that when a driver's foot rests against the footrest at least one element underlies the area of the foot as mapped by the sensing means. Depending on the area of each of the piezoelectric elements, the position of the driver's foot and/or the type of footwear worn by the driver, it is possible that two or more piezoelectric elements overlap with the mapped area and will therefore be activated to provide haptic feedback.

The piezoelectric elements may be in the form of piezoelectric ceramic layers. Piezoelectric strips, for example, each comprising a conductive electrode bonded to two ceramic layers or plates, provide enhanced displacement as compared to monolithic piezoceramic elements. The use of piezoelectric strips further allows particular areas of the pedal to be targeted to provide more concentrated feedback, or they can be arranged in a substantially uniform array over the area of the footrest. Piezoelectric strips may be arranged, for example, in a plurality of rows and columns, across the surface of the pedal plate (footrest). In one such arrangement, two or more columns each comprising four to twelve rows of strips may be provided on the footrest.

Different forms of piezoelectric elements may be provided on the same pedal enabling a variety of pulsing effects to be achieved, either in response to the area and/or level of pressure sensed, or related to the particular message to be imparted to the driver. Thus it is possible to provide a driver with different pulsing intensities and/or frequencies and targeted to specific actuators within the mapped area in order to impart the desired haptic feedback.

The piezoelectric elements may be located on the upper pedal surface in the region of the footrest, for example, in a recessed portion of the pedal backplate and overlaid with or embedded within a protective layer. The pressure sensing means may then overlie the protective layer. The protective layer may comprise a rubber or other such electrical insulating material. In this way, the circuitry associated with each of the piezoelectric elements and the pressure sensing material is insulated from each other. The protective layer is of a thickness that permits the driver to feel the pulsing sensation generated by the piezoelectric elements.

The protective layer that overlies the piezoelectric elements may comprise the anti-slip surface for the driver's foot. The outwardly facing surface can be contoured, such as in the form of a series of ridges or pattern of protuberances, to provide a frictional effect with the driver's foot.

The pressure sensitive material may be applied as a layer to form the upper surface of the pedal. For example, it may be applied over the protective layer that also acts as the anti-slip surface of the footrest. Application may be made, for example, by overmoulding or coating, or by adhering a sheet of the material, such as by lamination. Alternatively, the pressure sensitive material or pressure sensors may be provided beneath an outer protective layer. In the latter case, the outer protective layer may be a resilient layer such that a force applied thereto, such as by a driver's foot, is transferred beneath to the pressure sensing means.

In an embodiment of the invention, the pedal comprises a pedal arm which is connected to the vehicle body at its distal end, the proximal end carrying the footrest or pedal plate. Commonly, the pedal arm is connected via a housing to the vehicle body. The pedal arm provides a convenient means for accommodating electrical connections, such as hardwiring, from the footrest area to control means for controlling the activation of the piezoelectric actuators in dependence on an output from the sensing means. For example, the pedal arm may include a conduit, such as in the form of a channel or bore, in which the electrical wiring may be accommodated.

Electrical connections to the controller may be via a printed circuit board (PCB). Being compact, the PCB may be local to the pedal, for example within the housing, which may be accommodated within or adjacent to the footwell, and patched to the controller elsewhere on the vehicle. A single lead may provide the patching for transferring data between the pedal and the vehicle's on-board computer. To this end, the housing which receives the end of the pedal arm may be provided with an electrical connector for connecting with the lead.

Electrical connections may be provided through the pedal arm between the pressure sensing means and a PCB and between the piezoelectric elements and a PCB. The same PCB may be used to provide the electrical connections with both the piezoelectric elements and the pressure sensing means, or separate PCBs may be used. The connections from the piezoelectric elements may be multiplexed to reduce the amount of hardwiring required.

According to a yet further aspect of the present invention there is provided a haptic feedback system for a vehicle, the system comprising the aforementioned pedal and a controller for receiving an input from the sensing means relating to the area of the footrest in contact with the driver's foot and for delivering an output to selectively activate piezoelectric actuators overlapping the contact area in dependence on a sensed state of the vehicle.

In an embodiment, the vehicle state that may be sensed may be selected from, but is not limited to, the motion of the vehicle, including one or more of vehicle speed, rate of acceleration, rate of deceleration (braking), pattern of acceleration and deceleration, the position of the vehicle, including in relation to a perceived hazard or obstruction, or to a route selected by the vehicle navigation system, or to conditions relating to vehicle maintenance, fuel and oil levels, or the like. It will be understood that haptic feedback may be generated in the vehicle pedal most appropriate to the circumstances. For example, feedback relating to speed, such as excessive speed or acceleration, vehicle maintenance, etc. may be more appropriately delivered through the accelerator pedal, whereas feedback relating to braking and deceleration may be more appropriately delivered through the brake pedal. Accordingly, in another embodiment, the haptic feedback system may be implemented on both accelerator and brake pedals.

The control means in the form of a controller, as described herein, may comprise a control unit or a computational device having one or more electronic processors. A vehicle and/or a system thereof may comprise a single control unit or electronic controller or alternatively different functions of the controller may be embodied in, or hosted in, different control units or controllers. Thus, the term control system as used herein will be understood to include both a single control unit or controller and a plurality of control units or controllers collectively operating to provide the required control functionality. The output from the control means, namely the selective activation of the piezoelectric actuators, may be provided as a set of instructions embedded in one or more electronic processors, or alternatively, the set of instructions could be provided as software to be executed by one or more electronic processor(s).

Optionally, the control means may be operable to actuate the piezoelectric elements in the mapped area to provide a variety of pulsing intensities (magnitude) and/or frequencies. In this way, the feedback to the driver may be delivered differently according to the intended signal. For example, a relatively high pulsing frequency and intensity may signal urgency, such as in an emergency situation, and a relatively low frequency and intensity may simply be an advisory signal that the vehicle is not being driven in a fuel efficient manner. The controller may be operable to selectively activate the piezoelectric elements by applying a time varying voltage, wherein the amplitude and/or frequency is dependent on the sensed state.

In another embodiment, the control means is operable to deliver haptic feedback relating to navigation of the vehicle. For example, the control means may be operable to pulse the piezoelectric actuators within the left hand side only of the mapped area for providing the driver with a message that he is approaching a location where a left turn of the vehicle is required. Similarly, pulsing of the piezoelectric actuators on the right hand side of the mapped area may signal the approach of a right hand turn. In a navigation system, a high intensity and/or high frequency pulsing may indicate that the required left or right turn is imminent. For example, the intensity and/or frequency may increase to indicate the proximity of the turning.

Haptic feedback relating to navigation of the vehicle via a pedal may be provided independently of sensing means used to determine the position of the driver's foot. Accordingly, and from another aspect of the invention, there is provided a navigational aid for vehicle fitted with a navigation system comprising a pedal provided with a plurality of piezoelectric actuators operable to provide haptic feedback to a driver through the footrest, and control means responsive to the navigation system for activating selected piezoelectric actuators to deliver a navigational direction signal to the driver.

In an embodiment of the navigational aid, the pedal may comprise sensing means, as hereinbefore described, for mapping the area of the footrest in contact with a driver's foot, whereby the control means is further responsive to the sensing means so that the navigational direction signal is delivered by activating selected piezoelectric actuators in the mapped area.

The sensing means for the navigational aid may comprise pressure sensing means as hereinbefore described.

In another embodiment, relating to any or all aspects of the invention, the haptic feedback system comprises an activator for activating and/or deactivating the controller. In this way, the driver can decide whether or not to use the haptic feedback mechanism. In certain driving conditions, receipt of haptic feedback via the accelerator or brake pedal may not be required or desirable. Thus the system may be implemented as an optional feature.

In a further aspect of the present invention, there is provided a vehicle comprising the aforementioned haptic feedback system.

According to yet another aspect of the invention, there is provided a method of providing haptic feedback to a driver in a vehicle through the footrest of an accelerator or brake pedal comprising:
  sensing the area of the footrest in contact with a driver's foot; and
  selectively activating one or more piezoelectric actuators within the sensed area in response to a sensed state of the vehicle.

The signal from a vehicle controller may relate to a sensed state of the vehicle as hereinbefore described.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 3a shows an enlarged perspective view of the pedal of FIG. 2, and FIG. 3b shows a cross-section through the pedal of FIG. 3a;

DETAILED DESCRIPTION

Figure 1:
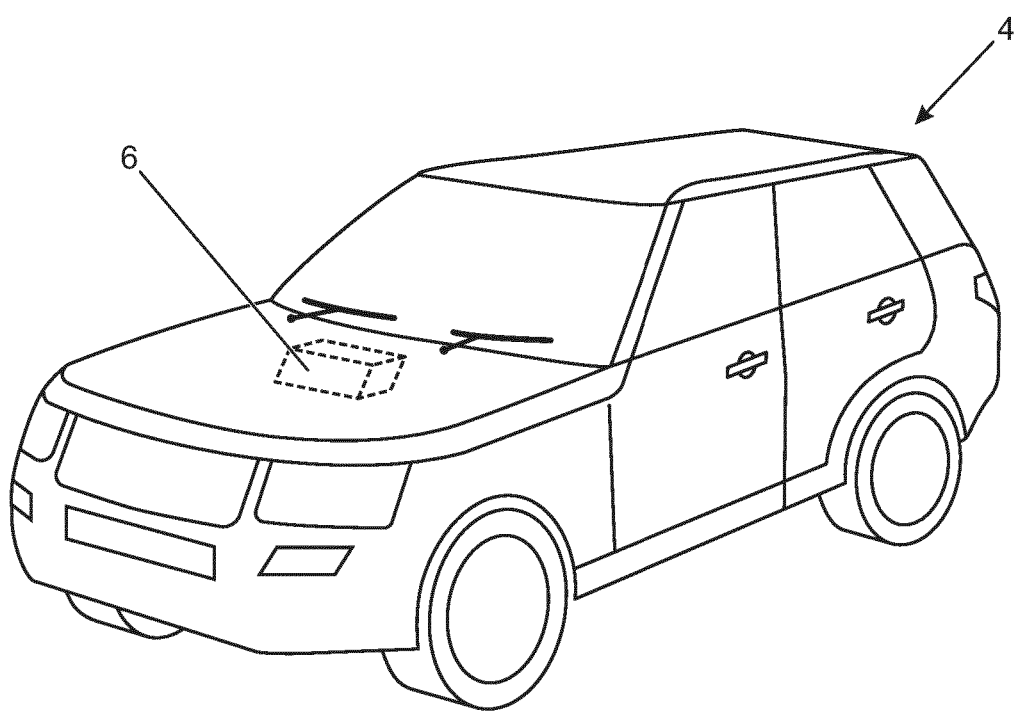
FIG. 1 shows a schematic view of a vehicle in which a pedal according to an embodiment of the invention may be used.

With reference to FIG. 1, a vehicle (4) includes a haptic pedal system (not shown) in accordance with embodiments of the invention and a controller (6) for controlling operation of the pedal system and various other systems and sub systems of the vehicle and vehicle cabin.

Figure 2:
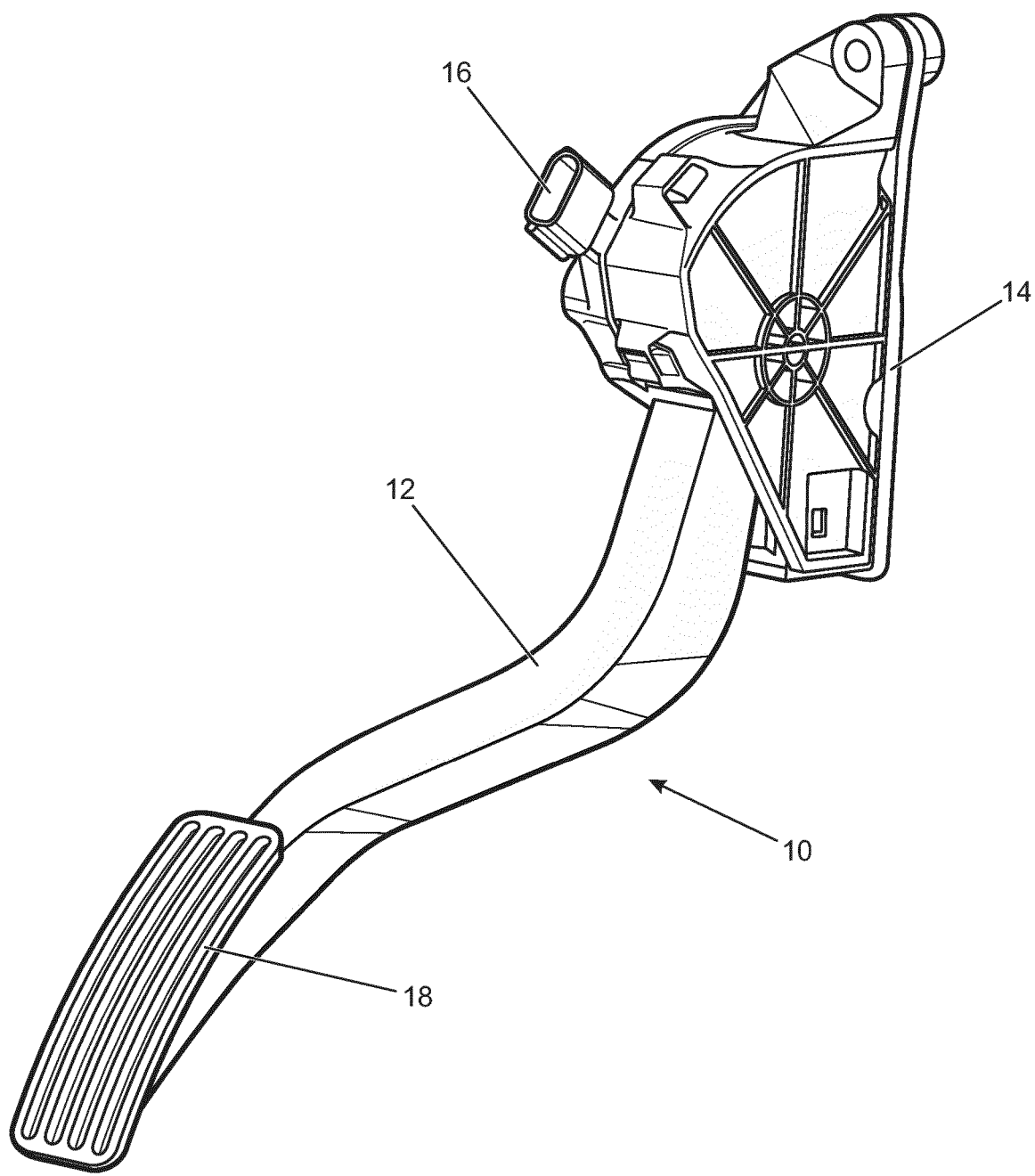
FIG. 2 shows a perspective view of a pedal according to an embodiment of the present invention attached to a housing.

Referring to FIG. 2, the pedal system includes a vehicle pedal (10) having a pedal arm (12) pivotally mounted at a distal end in a housing (14) secured to the vehicle body (not shown). The housing (14) is provided with an electrical connector (16) for providing an electrical connection with the vehicle's computer (not shown). At the lower end of the pedal arm (12) there is mounted a footrest or pedal plate (18).

Figure 3:
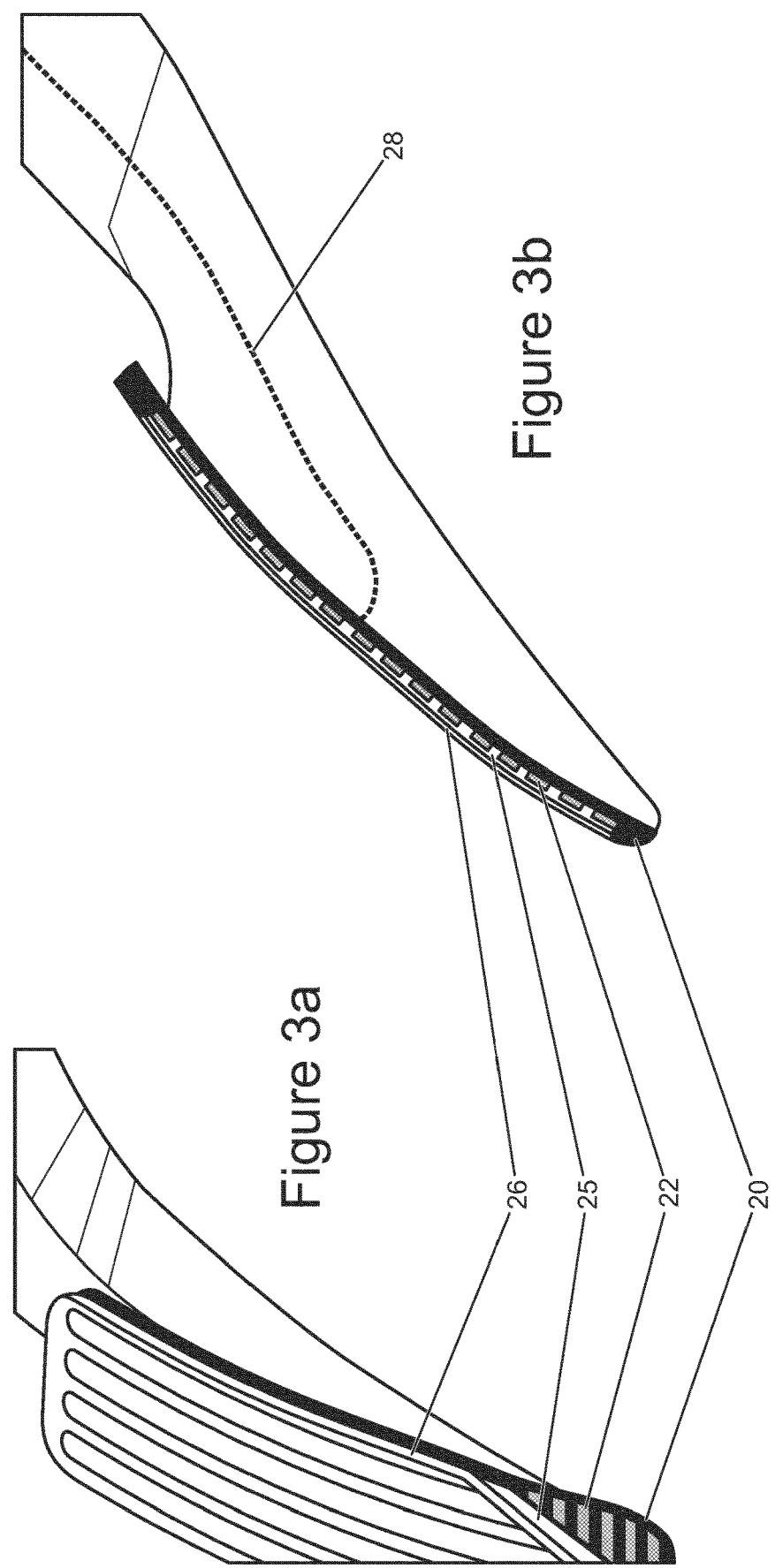

As shown in FIGS. 3a and 3b, the footrest (18) mounted on the pedal arm (12) is comprised of several layers. At the base, there is a backplate (20) having a recessed portion within which is mounted a layer comprising an array of piezoelectric actuator elements (22). The elements (22) are overlaid with a resilient material (25) which is coated with a pressure sensitive layer (26). An electrical connection (28) to the pressure sensitive coating (26) and to the piezoelectric elements (22) is routed through the pedal arm (12) to electrical connections (not shown) within the housing (14). The resilient material (25) has a thickness such that pulsing of the elements (22) may be felt by a driver's foot when resting on the footrest (18).

Figure 4:
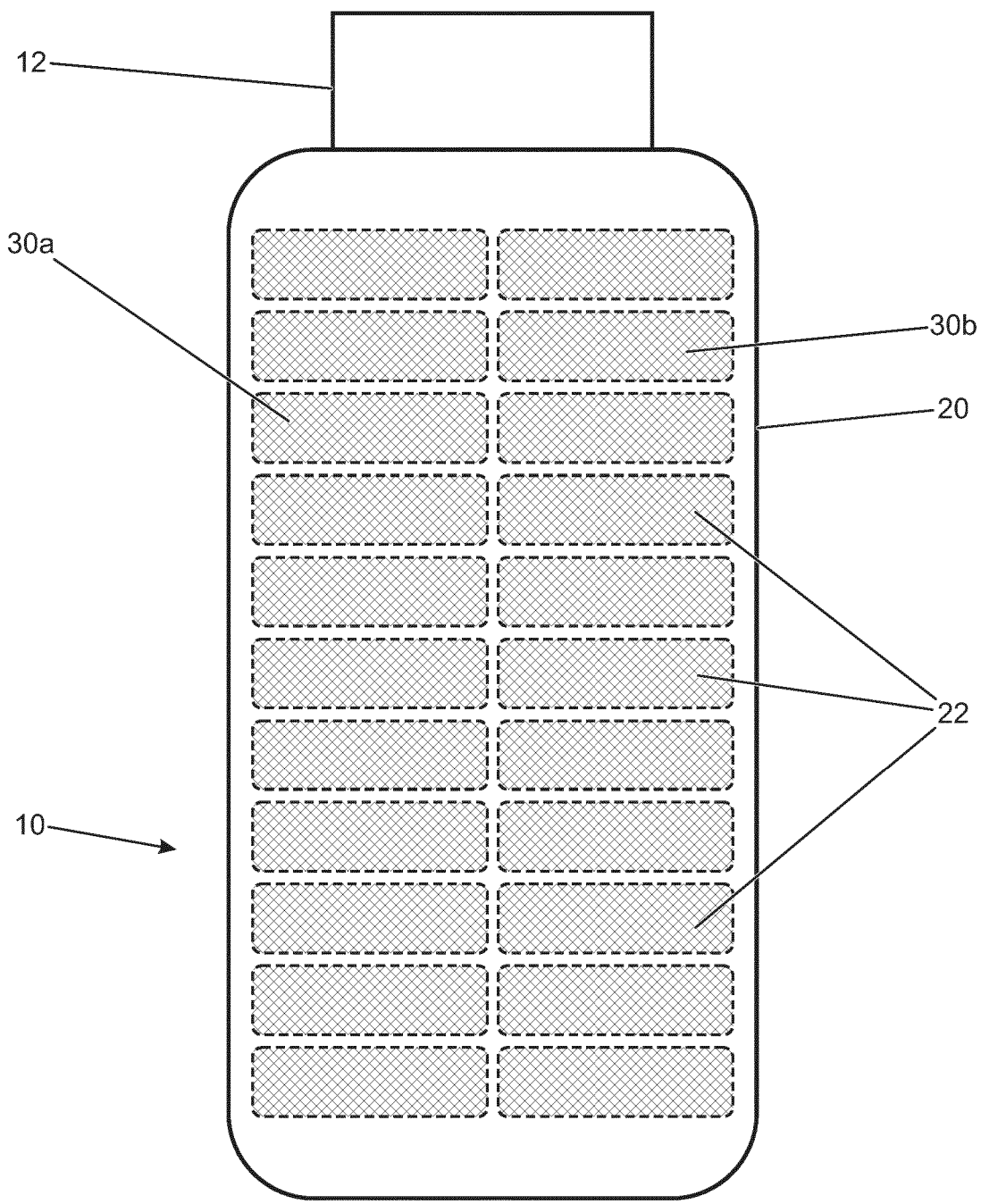
FIG. 4 shows a plan view of a pedal carrying an array of piezoelectric strips according to another embodiment of the invention.

FIG. 4 shows a plan view of an array of piezoelectric elements on a pedal backplate (20). The piezoelectric elements are laid in two columns (30a, 30b) on the left hand side and right hand side respectively of the backplate (20). Each element (22) is separately electrically connected to a controller (not shown) and can therefore be individually controlled and activated. Therefore, when forming part of a haptic feedback system, only the elements (22) underlying (whether partially or entirely) a driver's foot are activated, avoiding expending energy in pulsing elements which the driver cannot detect.

Figure 5:
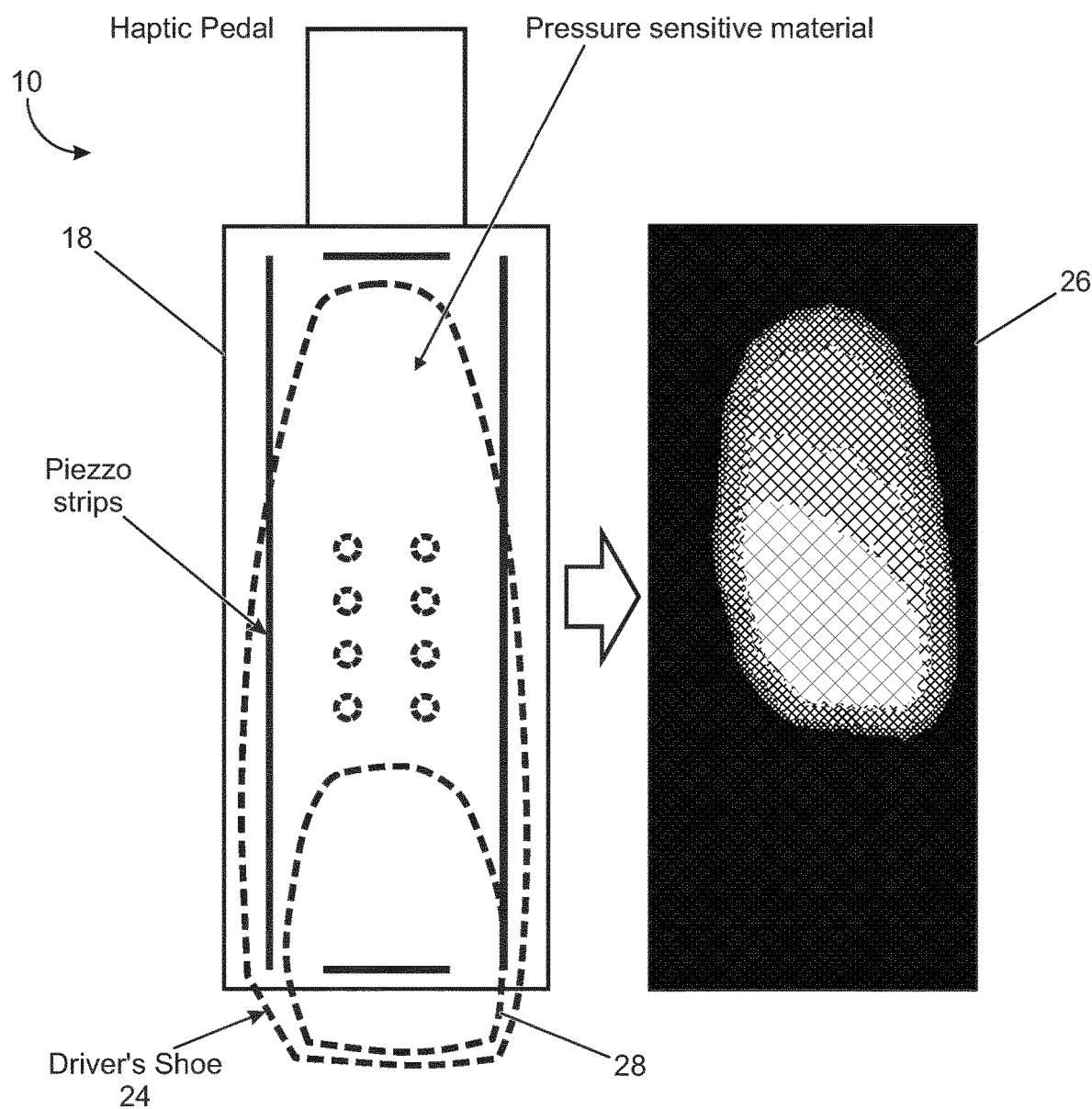
FIG. 5 is a diagram illustrating a mapped pressure area on a pedal according to an embodiment of the invention.

FIG. 5, on the left, provides an illustration of a driver's foot in a shoe (24) on a haptic feedback pedal (10) according to an embodiment of the invention together with, on the right, a pressure pattern (26) as mapped by the pressure sensing material. The dashed lines indicate the position of the driver's shoe (24) over the footrest (18) of the pedal (10). Due to the contoured undersurface of the driver's shoe (24), only a portion of the sole of the shoe including a portion of the heel (28), is in actual contact with the footrest (18) and therefore the pressure sensitive layer detects only those contacting portions of the sole area, as shown from the pressure map (26) in the right hand diagram. In use of the invention, only piezoelectric strips (not shown in FIG. 5) that underlie the area of contact (i.e. the mapped area) are selected for activation to provide haptic feedback to the driver via the contacting areas of the sole.

By way of example only, in the embodiment shown in FIG. 5, approximately 38% of the upper surface of the footrest is in contact with the driver's shoe (24) and the overlap with the piezoelectric strips is such that approximately 45% of the strips on the footrest are selectively activated. This represents more than 50% energy saving in providing haptic feedback to the driver.

The piezoelectric columns (30a, 30b) may comprise any number of individual elements, depending on the required resolution. Typically, the array of elements may be formed into left and right side columns (30a, 30b), as shown in FIG. 4, but in an alternative embodiment more than two columns may be provided. A single column of piezoelectric elements may also be used.

Each column (30a, 30b) may include piezoelectric elements of rectangular profile, as shown in FIG. 4, but other shapes are also envisaged, including square and circular piezoelectric elements. In a simplified system, the piezoelectric array may include just three elements in each column (30a, 30b), three on one side and three on the other.

In another embodiment (not shown) the haptic pedal may be implemented in a navigational system in which directional information or instruction is notified to the driver by activating selected elements of the piezoelectric strips (22, 30a, 30b). The navigational system may take the form of a known navigational system in which a driver enters a desired destination, and is provided with route instruction, including for example left and right hand turn instruction, to direct them to the desired route. The haptic pedal of the invention may be configured to provide the driver with this left and right hand turn instruction by activating selectively certain elements depending on whether a left or right turn is required.

Navigational feedback may be configured in response to the detected position of the driver's foot on the pedal. For example, if the driver's foot is detected to be in a substantially centred position with respect to the pedal, selective activation of the left hand column (30a) may indicate that a left hand turn is required, and activation of the right hand column (30b) may indicate a required right hand turn. In the event that the driver's foot is detected to be off-centre in relation to the pedal, the control means may be adapted to determine the centre of the foot placement in the mapped area and activate the piezoelectric actuators to the left or right of the centre as so determined. Alternatively, the system may be configured such that the navigational haptic signal through the pedal is disabled when the driver's foot is detected to be substantially off-centre. Instead of disabling the system, or in addition thereto, a warning signal may be given to alert the driver to reposition his foot more centrally on the pedal.

It will be appreciated therefore that the haptic pedal incorporating the piezoelectric elements can be used to provide directional haptic feedback to the driver. Navigational instruction may be used in combination with more traditional techniques, whereby a driver is notified via a display screen or an audio system of route guidance preferences, or may be used in isolation to improve efficiency.

It will be appreciated by a person skilled in the art that the invention could be modified to take many alternative forms without departing from the scope of the appended claims.

The invention claimed is:

1. A haptic pedal for a vehicle comprising;
   a plurality of piezoelectric actuators individually operable for providing haptic feedback to a driver through a footrest; and
   sensing means for mapping the area of the footrest in contact with a driver's foot whereby haptic feedback is delivered by selective activation of the actuators in the mapped area.

2. The pedal of claim 1 wherein the sensing means comprises pressure sensing means.

3. The pedal of claim 2 wherein the sensing means comprises a pressure sensitive material.

4. The pedal of claim 3 wherein the pressure sensitive material comprises a layer of the footrest.

5. The pedal of claim 3 wherein the pressure sensitive material comprises an electrically conductive material.

6. The pedal of claim 5 wherein the electrically conductive pressure sensitive material comprises a quantum tunneling composite material.

7. The pedal of claim 1 wherein the piezoelectric actuators comprise a layer of piezoelectric elements disposed on the footrest such that at least one element underlies the foot when a driver's foot is applied to the pedal.

8. The pedal of claim 1 wherein the piezoelectric actuators comprise an array of piezoelectric strips.

9. The pedal of claim 1 wherein a resilient layer is interposed between the piezoelectric actuators and the sensing means.

10. The pedal of claim 1 having a pedal arm comprising a conduit for electrical connections from the piezoelectric actuators and the sensing means to a controller.

11. A haptic feedback system for a vehicle, the system comprising the pedal according to claim 1 and a controller for receiving an input from the sensing means relating to the area of the footrest in contact with the driver's foot and for delivering an output to selectively activate piezoelectric actuators overlapping the contact area in dependence on a sensed state of the vehicle.

12. The feedback system of claim 11 wherein the controller is operable to vary the pulsing intensity and/or frequency of the piezoelectric actuators in dependence on the sensed state.

13. A vehicle comprising the haptic feedback system of claim 11.

14. A method of providing haptic feedback to a driver in a vehicle through a footrest of a pedal, the method comprising:

sensing an area of the footrest in contact with a driver's foot; and selectively activating one or more piezoelectric actuators within the sensed area in response to a sensed state of the vehicle.

15. A navigational aid for a vehicle fitted with a navigation system comprising;

a pedal provided with a plurality of piezoelectric actuators operable to provide haptic feedback to a driver through a footrest of the pedal; and control means responsive to the navigation system for activating selected piezoelectric actuators to deliver a navigational direction signal to the driver, wherein the pedal comprises sensing means for mapping the area of the footrest in contact with a driver's foot and wherein the control means is further responsive to the sensing means such that the navigational direction signal is delivered by activating selected piezoelectric actuators in the mapped area.

16. The navigational aid of claim 15 wherein the control means is adapted to disable navigational direction signals in the event that the sensing means detects that the driver's foot is substantially off-centre with respect to the footrest.

* * * * *